United States Patent [19]

Rogler et al.

[11] 3,959,454

[45] May 25, 1976

[54] PRODUCTION OF SODIUM ALUMINUM HYDRIDE

[75] Inventors: Walter Rogler, Bonn; Otto Bleh, Bergheim, Sieg; Wilhelm Joch, Niederkassel, all of Germany

[73] Assignee: Dynamit Nobel Aktiengesellschaft, Troisdorf, Germany

[22] Filed: Mar. 18, 1971

[21] Appl. No.: 125,819

[30] Foreign Application Priority Data

Apr. 18, 1970 Germany............................ 2018765

[52] U.S. Cl. ................................................ 423/644
[51] Int. Cl.² ............................................. C01B 1/00
[58] Field of Search....................... 23/365; 423/644

[56] References Cited
UNITED STATES PATENTS

| | | | |
|---|---|---|---|
| 2,550,985 | 5/1951 | Finholt............................. | 23/365 X |
| 2,900,224 | 8/1959 | Hinckley et al..................... | 23/365 |
| 3,222,288 | 12/1965 | Hansley et al..................... | 23/204 X |

FOREIGN PATENTS OR APPLICATIONS 37-11802   8/1962   Japan.................................... 23/365

*Primary Examiner*—Herbert T. Carter
*Attorney, Agent, or Firm*—Burgess, Dinklage & Sprung

[57] ABSTRACT

In the production of sodium aluminum hydride by reaction of an aluminum chloride etherate with sodium hydride in an inert liquid dispersing agent, the improvement which comprises using as said sodium hydride reagent coarse-grained sodium hydride which is first ground in said dispersing agent to a particle size less than about 12 microns; preferably the inert dispersible agent is tetrahydrofurane or a lower alkyl ether of a lower alkylene glycol, whereupon the resulting sodium aluminum hydride dissolves in the reaction medium.

5 Claims, No Drawings

PRODUCTION OF SODIUM ALUMINUM HYDRIDE

The present invention relates to the production of sodium aluminum hydride.

Sodium aluminum hydride has increasingly been gaining importance as a reducing agent by virtue of its specificity for reducing the functional groups of organic compounds, without attacking carbon-carbon double bonds.

It is known from German Pat. No. 1,070,149, for example, to produce sodium aluminum hydride by reacting a sodium hydride-paraffin oil dispersion prepared by hydrogenation of sodium in this hydrocarbon, with aluminum chloride etherate in tetrahydrofurane as reaction medium but the yield is only 78%.

German Pat. No. 1,282,615 teaches making sodium aluminum hydride from sodium and/or sodium hydride dispersions in inert organic reaction media by reaction with dispersed aluminum under high pressue, e.g. 10 – 350 atmospheres $H_2$ (absolute) and temperatures between 50° and 200°C, but the yields are in this case 65 to 71%. For the activation of the aluminum, grinding before or during the reaction is suggested, in the possible presence of sodium or sodium hydride.

With the exception of the synthesis of sodium aluminum hydride by reaction of sodium, aluminum and hydrogen in an autoclave at high temperatures, all other hitherto known methods for making sodium alanate used the sodium hydride in the form of a dispersion in an inert very high-boiling hydrocarbon.

The covering of finely dispersed sodium hydride with protective substances such as paraffin oil makes safe-handing possible. The presence of an additional foreign component during the reaction leads to a reduction of the space/time yield and, for purification of the product, necessitates an additional removal step.

In addition, as a practical matter it is often necessary for the makers of sodium aluminum hydride to purchase sodium hydride since ordinarily their manufacturing facilities are not equipped to produce it. Until now, a safe-to-handle commercial product existed only in the form of a paraffin oil dispersion. It has recently become possible to produce a coarse-crystalline, free flowing and not self-igniting sodium hydride of a particle size of about 500 to 800 microns. Surprisingly, this product is not reactive with aluminum chloride etherate even if, in dispersion, it is ground to a particle size of 20 to 30 microns.

It is accordingly an object of the invention to produce sodium aluminum hydride easily, safely and in high yield.

These and other objects are realized in accordance with the present invention which involves the reaction of an aluminum chloride etherate with sodium hydride in an inert liquid dispersing agent. The sodium hydride is employed as a dispersion in which it has been ground from its coarse-grained, free-flowing non self-igniting form to a maximum particle size of about 12 and preferably about 10 microns. Advantageously at least about half the sodium hydride, by weight, is less than about 5 microns in size.

The dispersing agent in which the grinding takes place is desirably the same as the liquid medium in which the reaction is carried out. It can be an inert non-solvent such as naphtha although preferably it is tetrahydrofurane or a lower alkyl ether of a lower alkylene glycol such as the dimethyl ether of di- or tri-ethylene glycol which is a solvent for the sodium aluminum hydride.

This invention is illustrated in the following examples wherein all parts are by weight unless otherwise expressed.

Example 1 a. A 500 l autoclave equipped with heater, anchor agitator, crushers, temperature measuring and filler sockets as well as inlets and outlets for gas, was charged with 150 kg of powdered sodium hydride of 500 to 800 microns particle size after the dry air in the apparatus had been replaced by dry nitrogen. Following that, the vessel was heated to a temperature of 290° to 300°C with stirring and the nitrogen was displaced with hydrogen. The gas outlet was closed off and from a pressure line so much hydrogen introduced that a hydrogen pressure of about 3 atmospheres absolute existed inside the vessel. Then, through a heated metering device liquid sodium was continuously introduced into the vessel at a rate of 6 kg/hour. To maintain the hydrogen pressure during the process it was necessary to feed in hydrogen at the rate of 2.9 $Nm^3$ per hour. After about 20 hours of running time, addition of liquid sodium was interrupted, the hydrogen consumption then immediately dropping to zero.

After turning off the heat, the reaction mixture was cooled down to room temperature with stirring. After reducing the pressure to atmospheric, the reaction vessel was flushed with dry nitrogen and under this protective gas 120 kg of sodium hydride of 500 to 800 micron particle size was withdrawn from the reaction vessel.

b. In a laboratory-size ball mill of 200 mm diameter and 300 mm length, 1 kg of sodium hydride produced as in (a) was ground together with 2 kg of tetrahydrofurane.

After about 8 hours of running, the maximum sodium hydride particle size was 8 microns, 90% being under 5 microns.

c. In a separate agitator vessel, equipped with a return-flow cooler, a solution of 1375 g of aluminum chloride was dissolved in 3 liters of diethyl ether and mixed with 7 kg of tetrahydrofurane. To this solution over a 30 minute period there was added with stirring the sodium hydride-tetrahydrofurane dispersion of (b) directly from the ball mill, the solution heating up to boiling. At the end of the sodium hydride addition boiling ceased. The solution was cooled and centrifuged so as to separate the formed sodium chloride and any unreacted sodium hydride. Following that, the clear solution was evaporated, a gray white dry powder being then obtained.

This powder was washed with diethyl ether to remove any residue of unreacted aluminum chloride. The purity of the resulting sodium aluminum hydride was 98.5%, the yield based on sodium hydride used was 92%.

Example 2

Example 1 was repeated except that the sodium hydride was ground in solvent naphtha, b.p. 187°–213°C, and the NaH-solvent naphtha dispersion was used in the reaction.

Example 3

In the ball mill used in Example 1, 1 kg of sodium hydride of the same particle size and 2 kg of tetrahydrofurane were ground.

After 1.5 hours of running time, the sodium hydride particle size was 20 to 30 microns. Analogously to Example 1, an aluminum chloride-ether-THF solution was prepared. On addition of the sodium hydride-THF dispersion no spontaneous heating was observed. The mixture was heated 16 hours under reflux and then cooled. After cooling, the mixture was centrifuged and the clear solution examined for sodium and active hydrogen.

| Result: | Sodium | 30 mg/l |
|---|---|---|
| | Hydrogen | 50 cc/l, | indicating formation of sodium aluminum hydride had not occurred to a commercially useful extent.

It will be appreciated that the instant specification and examples are set forth by way of illustration and not limitation and that various modifications and changes may be made without departing from the spirit and scope of the present invention.

What is claimed is:

1. In th production of sodium aluminum hydride by reaction of an aluminum chloride etherate with sodium hydride in an inert liquid dispersing agent, the improvement which comprises using as said sodium hydride reagent coarse-crystalline free flowing non-self-igniting sodium hydride which is first ground in said dispersing agent to a particle size less than about 12 microns.

2. Process according to claim 1, wherein the inert dispersing agent is a solvent for the resulting sodium aluminum hydride.

3. Process according to claim 2, wherein the inert dispersing agent is tetrahydrofurane or a lower alkyl ether of a lower alkylene glycol.

4. Process according to claim 1, wherein the coarse-grained sodium hydride is ground to a particle size less than about 10 microns with more than about half by weight having a particle size below about 5 microns.

5. Process according to claim 4, wherein the aluminum chloride etherate is that of diethyl ether and is dissolved in tetrahydrofurane, the sodium hydride being ground in tetrahydrofurane and the two tetrahydrofurane media being combined and any undissolved solids being removed from the resulting solution of sodium aluminum hydride.

* * * * *